July 3, 1956  H. H. RAYMOND ET AL  2,752,800
REVERSIBLE DRIVE MECHANISM
Filed Feb. 1, 1951  2 Sheets-Sheet 1

Inventors
HORACE H. RAYMOND
HOWARD H. SARGENT, JR.
By Lindsey and Prutzman
Attorneys Inventors
HORACE H. RAYMOND
HOWARD H. SARGENT, JR.
By Lindsey and Prutzman
Attorneys

United States Patent Office 2,752,800
Patented July 3, 1956

2,752,800
REVERSIBLE DRIVE MECHANISM

Horace H. Raymond, Berlin, and Howard H. Sargent, Jr., Portland, Conn., assignors to Raymond Engineering Laboratory, Inc., Middletown, Conn., a corporation of Connecticut Application February 1, 1951, Serial No. 208,878

6 Claims. (Cl. 74—361)

This invention relates to a mechanism for use between a driving and driven shaft which is effective for driving the driven shaft selectively in either direction while the driving shaft is rotated continuously and unidirectionally and, more particularly, which is able to change the direction of rotation of the driven shaft instantaneously and repeatedly as desired. More especially, the invention relates to a mechanism having a gear train including a duo-clutch of the magnetic fluid type which can be selectively energized to cause the improved operating results referred to.

The device of the present invention is particularly useful in situations where it is desirable to provide means for instantaneously switching an output shaft from one direction of rotation to another without altering the rotation or driving movement of the prime mover. It is also quite desirable where it is desired to utilize a compact drive mechanism having self-contained clutch or switching means that will stand up under repeated use.

As an example of use for such mechanism, radar antennae are driven by a rotary drive mechanism generally in a closed circular path. It may be desirable to switch the direction of rotation back and forth across a relatively small arc and it may also be desirable to repeatedly shift the antennae back and forth at a relatively high frequency.

Accordingly, it is an object of this invention to provide a rotary drive mechanism having novel means for selectively rotating a driven element in either direction without switching the direction of rotation of the driving elements.

Another object of this invention is to provide a compact drive mechanism with means for rapidly changing the direction of rotation of the driven shaft which will not be dependent for operation upon any physical movement of elements whereby rapid action is assured.

An additional object of the present invention is to provide a novel and improved construction for a magnetic fluid clutch which particularly adapts the same for use in the duo-clutch mechanism of the present invention.

A still further object of this invention is to provide a compact driving mechanism using readily fabricated and assembled parts and having self-contained duo-clutch means utilizing a minimum of wearing parts for switching the direction of rotation of the driven member and which will be susceptible to continuous operation over long periods of time without breakdown or other failure.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
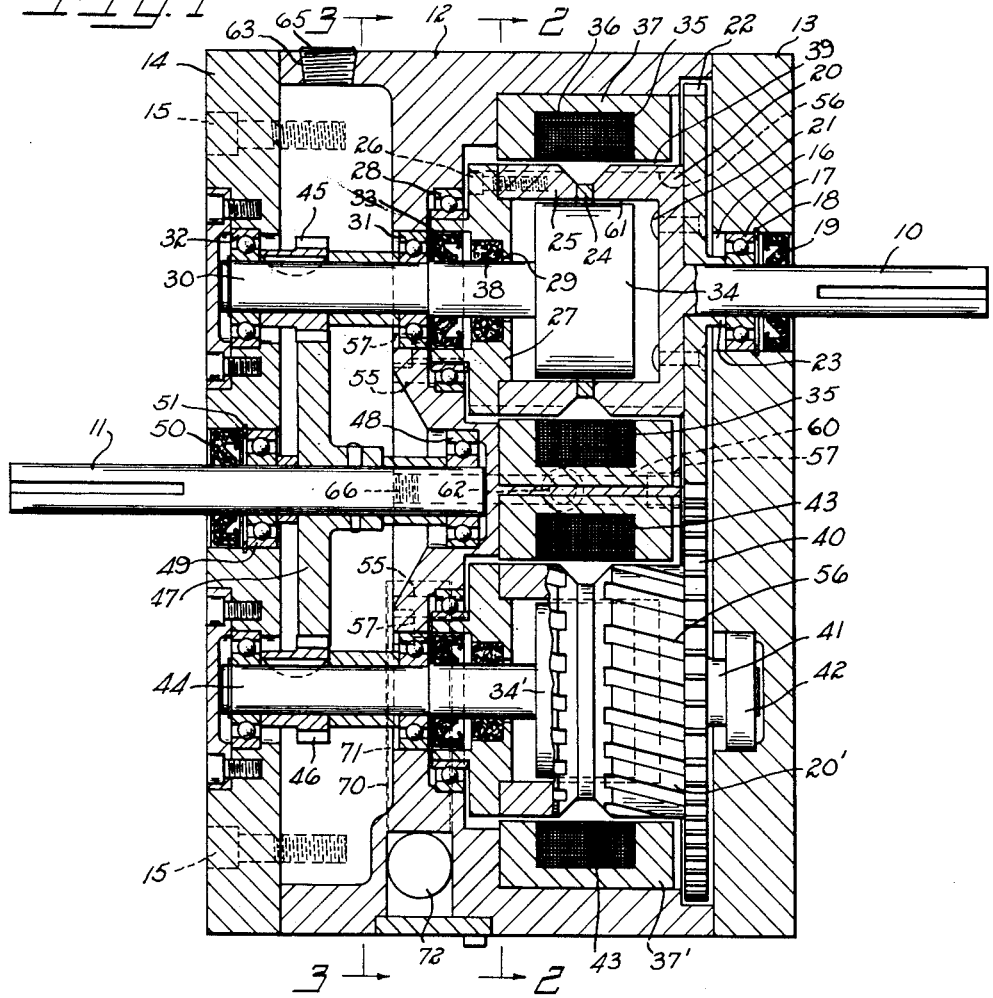
Figure 1 is a vertical cross-sectional view with parts in elevation and showing the drive mechanism of this invention.

As shown in detail in the drawings, the mechanism of this invention may comprise a drive shaft 10, a driven shaft 11, and the interconnecting driving linkages (to be described in detail later) which are journaled within a block 12, a back plate 13, and a front plate 14 which close the ends of the block 12 and are secured thereto as by screws 15.

The drive shaft 10, which may be drivingly connected to a prime mover such as an electric motor (not shown) is journaled within the back plate 13 in a suitable aperture 16 wherein an anti-friction bearing unit 17 is disposed to receive the shaft 10. The bearing unit 17 is held within the bearing aperture 16 by means of a split ring 18 disposed with its outer periphery embedded in the wall or plate 13 in an annular groove about the aperture 16. A seal unit 19 is disposed between the split ring 18 and the outer surface of the plate 13 to prevent leakage of fluids along the shaft 10.

The internally disposed end of the shaft 10 is provided with a cup-like configuration 20 to which is secured, as by rivets 21, a gear 22 for co-rotation therewith. The gear 22 has a hub 23 which thrusts against the inner race of the bearing unit 17 so that the bearing unit 17 cannot be axially shifted.

The drive shaft extension 20 is constructed of magnetizable material of low residual magnetism and comprises part of the driving member of a magnetic fluid clutch. The cup-shaped end is tapered to reduced thickness at its terminus where it is welded or brazed to a ring 24 of non-magnetizable material such as bronze. A ring 25 of magnetizable material is brazed to the other side of the ring 24 so that the rings 24 and 25 extend the cup-shaped portion of the shaft 10 to complete the driving member of the clutch. The purpose of the ring 24 of non-magnetizable material is to provide a central zone of high magnetic reluctance at this point. A similar result may be attained, however, by making the parts 20, 24 and 25 all of one piece from magnetizable material provided the section 24 is made very thin so as to create a section which is quickly saturated and thus capable of carrying only a small amount of flux. Screws 26 secure the ring 25 to a disk 27 journaled within the block 12 by bearing unit 28 for rotation with the shaft 10.

The disk 27 closes the open end of the cup-shaped portion of the shaft 10 but has a central opening 29 which accommodates an intermediate shaft 30 concentric to the shaft 10 and journaled in the block 12 and front plate 14 by anti-friction bearing units 31 and 32, respectively. A seal unit 33 disposed in the disk 27 tends to prevent fluid leakage along the shaft 30. A filter 38, situated in advance of the seal unit 33, retains the solids in the fluid within the clutch so that they will not reach the seal unit 33, which otherwise would cause rapid deterioration of the seal.

The inner end portion 34 of the shaft 30 is formed with an enlarged extension of generally cylindrical configuration and is concentrically and centrally disposed within the chamber defined by the disk 27, the rings 24 and 25 and the cup-shaped end 20 of the shaft 10. A small circumferential gap 61 separates the periphery of the cylinder end portion 34 from the members 20 and 25. The cylindrical end portion 34 is the second or driven member of the magnetic fluid clutch.

Because of the novel construction and arrangement of the driving and driven members of the clutch in accordance with the present invention, it is possible to employ a stationary magnet for energizing the clutch. In the embodiment shown, a stationary field winding 35 surrounding the cup-shaped portion 20, the non-magnetizable ring 24 and the magnetizable ring 25 is disposed within an annular groove 36 of a ring 37 formed of magnetizable material but having low residual magnetism. The ring 37 is separated from the members 20 and 25 by a small air gap 39. When the coil 35 is energized, the principal magnetic flux path induced thereby will pass downwardly from one side of the ring 37 across air gap 39 through the portion 20, then across gap 61 to the cylindrical end portion 34 on the shaft 30, returning upwardly through gap 61 to the ring 25 and thence across air gap 39 to the opposite side of the ring 37. In this way, magnetic lines of flux are induced across the relatively rotatable driving and driven members of the clutch by the stationary magnet 35.

The chamber defined within the cup-shaped portion 20 and its associated rings and annular member 27 is filled with a fluid suspension of minute particles of iron, carbonyl iron, or other readily magnetizable particles. The term "fluid suspension" is used herein to denote any flowable dispersion of the magnetizable particles suitable for use in a magnetic brake or clutch of the type referred to here. Such dispersions may be formed as a suspension of the magnetizable particles in a liquid such as oil, or in a semi-liquid such as a grease, or as a mixture of the particles with a dry lubricant such as graphite. When the coil 35 is energized, the particles within the cup-shaped portion align along the flux lines just described and provide a plurality of chains between the driving member of the clutch formed by the members 20 and 25 and the driven member of the clutch formed by the cylindrical end 34 on the shaft 30. The clutch preferably is formed with sufficient area and the magnetic field is of sufficient strength so that no slippage will take place between the driven and driving members of the clutch for the rated load of the device during normal operation. The chains securing the two members may be broken by merely switching off the supply of current to the coil 35. As soon as the switching is accomplished, the chains are no longer induced by coil 35 and there is no connection between the shafts 10 and 30.

It will be noted in Fig. 1 that an arrangement of similar parts in a similar manner appears at the lower part of the drawing. The chief difference is that the lowermost mechanism is not driven directly by an extending drive shaft 10 but is driven by a gear 40 on stub shaft 41 in mesh with the gear 22 on the shaft 10. The stub shaft 41 is journaled within the back plate 13 by the anti-friction bearing unit 42 and has a cup-shaped extension 20' similar to the portion 20 on the shaft 10. A second field coil 43 mounted in a ring 37' similar to ring 37 surrounds the cup-like portion on the shaft 41 and when energized causes clutching between the shaft 42 and a cylinder 34' on a second shaft 44. The clutch between shafts 41 and 44 is substantially identical with the clutch previously described between shafts 10 and 30 and thus need not be described in further detail here.

The shafts 30 and 44 carry pinions 45 and 46, respectively, which mesh with a gear 47 secured to the power take-off or driven shaft 11. The shaft 11 is journaled in the block 12 by the anti-friction bearing unit 48 and in the front plate 14 by the bearing unit 49. A seal member 50 and split ring 51 are disposed in the front plate 14 to seal the shaft opening in the plate 14 and to secure the bearing unit 49 against axial movement.

In operation, the drive shaft 10 and the stub shaft 41 will always rotate but in opposite directions, due to the driving connection of their associated gears 22 and 40. The drive shaft 10 may be used to drive the shaft 30 by energizing the associated magnetic clutch through the coil 35. If the coil 35 is not energized, the shaft 10 will rotate freely relative to the shaft 30.

If the coil 43 is energized, it will effect magnetic engagement between the shaft 41 and the shaft 44. This driving engagement causes rotation of the power take-off or driven shaft 11 in the same direction as the rotation of the drive shaft 10. The engagement or drive is effected through the pinion 46 on the shaft 44 and the gear 47 on the shaft 11. If the coil 43 is not energized and the coil 35 is energized, the power take-off or driven shaft 11 will rotate in a direction opposite to the direction of rotation of the drive shaft 10. This driving engagement or linkage is effected through the shaft 30 and its pinion 45 to the gear 47 on the shaft 11.

It thus will be seen that the direction of rotation of the driven shaft 11 may be determined by selectively energizing the coils 35 and 43 and the direction may be changed repeatedly as desired by alternately energizing the coils. The energizing or de-energizing may occur almost instantly and therefore the direction of rotation of the shaft 11 may be switched without any material time lag. In fact the change in direction may be accomplished so rapidly that the shaft 11 will have a so-called "flutter" action. On the other hand, if desired, the energizing or de-energizing of coils 35 and 43 may be carried out in a gradual manner to provide any degree of acceleration and deceleration, or these loads may be balanced to hold the mechanism in selected position.

A separate actuator may be used to energize or de-energize the coils 35 and 43 in any sequence desired. Such an actuator has not been shown, it being understood that conventional mechanisms could be employed to advantage.

Figure 2:
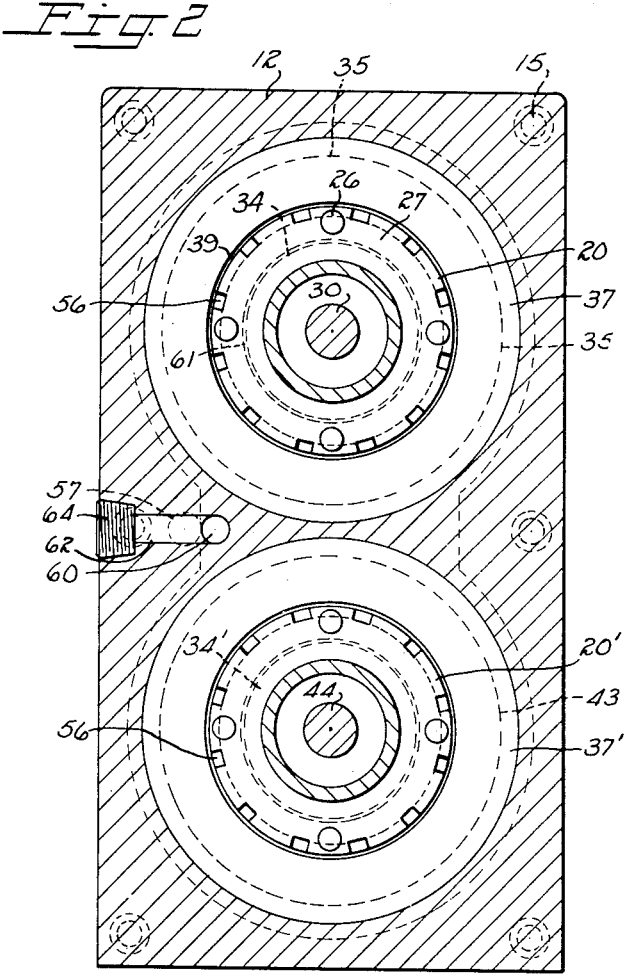
Fig. 2 is a vertical cross-sectional view taken on a plane transverse to the plane of Fig. 1 and viewed in the direction indicated by the arrows on line 2—2 of Fig. 1.
Figure 3:
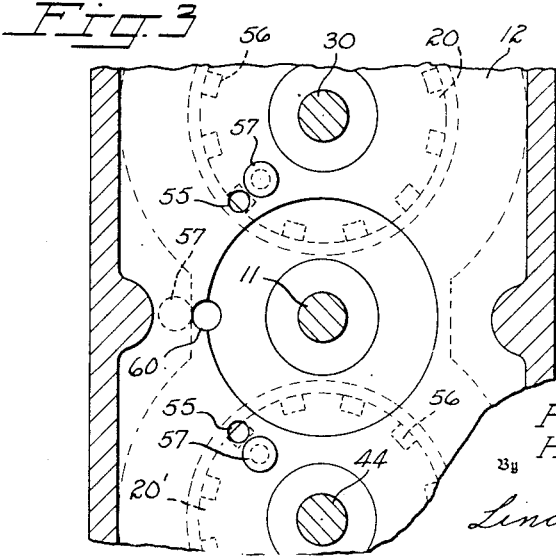
Fig. 3 is a fragmentary view similar to Fig. 2 as indicated by the arrows on line 3—3 of Fig. 1.

When slip or relative rotation of the driving and driven members occurs while these members are cut by magnetic lines of flux, heat will be generated within the clutch. Therefore in accordance with the invention a cooling system is provided and comprises a plurality of interconnecting chambers carrying a cooling lubricant. The chambers are defined by the block 12 and the back and front plates 13 and 14, and are so defined as to surround the interconnecting gears and the clutch mechanism connected to the shafts 10 and 41. A plurality of channels 55 in the block 12 permit the lubricant to flow from the chamber surrounding the interconnecting gears 45, 46 and 47 to the chamber surrounding the cup-shaped portions of the shafts 10 and 41. There are a plurality of circumferentially spaced diagonal grooves 56 in the outer periphery of each of the cup-shaped portions 20 and rings 25 of the clutches which induce the flow of the lubricant through the chambers defined within the coils 35 and 43. The lubricant can flow from the last-mentioned chambers back to the chamber surrounding the gears 45, 46 and 47 by means of a bore 60 (Fig. 2) in the block 12, spaced intermediate the coils 35 and 43. The teeth on the gears aid in pumping the cooling lubricant within the mechanism, and the lubricant flows through the anti-friction bearing units.

In many instances, the foregoing cooling system will be sufficient to retain the temperature of the clutch within acceptable limits. However, in the event of excessive heating, the cooling system is arranged for additional cooling effect by outside means. To this end, the bore 60 is provided with a side bore 62 opening to the exterior of the block 12, and an inlet opening 63 is provided to the chamber surrounding the interconnecting gears 45, 46 and 47. The side bore 62 and inlet 63 are normally closed by plugs 64 and 65, respectively. When additional cooling is required, the plugs 64 and 65 are removed and suitable connections are made to a heat interchanger (not shown) which may be of any conventional design. When external cooling is utilized, the exit of bore 60 is closed by inserting a plug in the threaded portion 66, thus forcing the fluid to return through the external cooling devices referred to.

The meshing gears 22 and 40 and the meshing gears 45, 46 and 47, during the course of operation, tend to flake off minute particles of steel which will flow with the cooling lubricant. Despite the use of filters and bearing seals, there also is some seepage of fluid containing magnetizable particles from the clutch into the cooling lubricant. Accordingly, if not removed, the presence of these particles tends to form a magnetic brake between the driving member and the stationary ring 37. In accordance with the invention, a plurality of permanent magnets 57 are disposed within the block 12, adjacent the lubricant passageways, such as the passageways 55 and 60, to collect the particles from the cooling lubricant and thus prevent formation of magnetic chains joining the driving plates of the clutches and the magnetic coils 35 and 43.

In the event the clutch of the present invention is utilized under conditions or in such manner that adequate heat is not produced or retained in sufficient amount to keep the internal liquids sufficiently fluid, it may be necessary to supply heat energy. This is accomplished automatically in accordance with the invention by providing a transverse bore 70 (shown in dotted lines in Fig. 1) in the block 12 in which is received an electric heater 71. The heater 71 is connected to a thermostat 72 also positioned within the block 12 in good thermal contact therewith. Suitable connections (not shown) to a source of electrical energy are provided. Accordingly, when the temperature of the clutch falls below a predetermined minimum, this is detected by thermostat 72 and the heater 71 is energized until the temperature deficiency is overcome.

It is apparent that the aforedescribed elements cooperate to provide a driving linkage between the driving member and the driven member operable selectively to rotate the driven member in either direction as desired. The elements also provide novel switching means to switch the direction of movement of the driven member instantaneously or gradually without requiring a shifting of gears or physical movement of any parts. The elements can therefore be compactly assembled within a relatively small space and, due to the fact that there are no contacting clutch elements, the shifting can be continued without fear of wearing out the parts of the mechanism. Further, shifting may be at such a rate as to become reciprocating or fluttering movement at the driven member. It will be understood that, although cylindrical driving and driven clutch members are illustrated here, flat or platelike members could be substituted for the purpose and operate with equal effect.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. A reversible drive mechanism comprising a housing having parallel cylindrical chambers; a magnetic fluid clutch in each chamber comprising a magnetic field member in the cylindrical wall of the chamber having axially spaced poles facing the chamber, a first rotor in the chamber having a cylindrical surface, a second rotor surrounding the first rotor and spaced from the first rotor to form a first gap and spaced from the chamber wall to form a second gap, said second rotor being formed with a ring of high magnetic reluctance between the said poles, and a fluid suspension of magnetizable particles disposed in said first gap; a drive shaft and a driven shaft extending from the housing: means connecting the drive shaft to one of the rotors of each clutch and connecting the driven shaft to the other rotor of each clutch to cause the driven shaft to turn in opposite directions, depending upon which magnetic field member is energized; a cooling liquid in the said second gaps of the magnetic fluid clutches; and means for circulating the cooling liquid.

2. A reversible drive mechanism comprising a housing having parallel cylindrical chambers; a magnetic fluid clutch in each chamber comprising a magnetic field member in the cylindrical wall of the chamber having axially spaced poles facing the chamber, a first rotor in the chamber having a cylindrical surface, a second rotor surrounding the first rotor and spaced from the first rotor to form a first gap and spaced from the chamber wall to form a second gap, said second rotor being formed with a ring of high magnetic reluctance between the said poles, and a fluid suspension of magnetizable particles disposed in said first gap; a drive shaft and a driven shaft extending from the housing; means connecting the drive shaft to one of the rotors of each clutch and connecting the driven shaft to the other rotor of each clutch to cause the driven shaft to turn in opposite directions depending upon which magnetic field member is energized; a cooling liquid in the said second gaps of the magnetic fluid clutches; and means for circulating the cooling liquid including a spiral groove in the outer surface of the said second rotor of each clutch.

3. A reversible drive mechanism comprising a housing having parallel cylindrical chambers and liquid passageways interconnecting the ends of the chambers; a magnetic fluid clutch in each chamber comprising a magnetic field member mounted in the cylindrical wall of the chamber having axially spaced poles facing the chamber, a first rotor in the chamber having a cylindrical surface, a second rotor forming a casing about the first cylinder and spaced therefrom to provide a first gap and spaced from the chamber wall to form a second gap, said second rotor being formed with a ring of high magnetic reluctance between the said poles and with a spiral groove facing the second gap, and a fluid suspension of magnetizable particles in the second rotor and first gap; a drive shaft and a driven shaft extending from the housing; means connecting the drive shaft to one of the rotors of each clutch and connecting the driven shaft to the other rotor of each clutch to cause the driven shaft to turn in opposite directions depending upon which magnetic field member is energized; and a liquid in said passageways and in said cylindrical chambers surrounding the said second rotors for circulation by the spiral grooves of the second rotors.

4. A reversible drive mechanism as defined in claim 3 and including, in addition, a permanent magnet associated with one of the liquid passageways to remove magnetic particles from the liquid to prevent the liquid from forming a magnetic fluid clutch between the housing and the said second rotors.

5. A reversible drive mechanism as defined in claim 3 and including temperature control means for the liquid comprising an electrical heating element and a thermostat associated with one of the liquid passageways.

6. In a drive mechanism, a stationary housing having a cylindrical cavity, a magnetic field member fixed in the housing having poles facing radially inwardly of the cavity and spaced apart longitudinally of the cavity, an outer rotor of magnetizable material rotatably mounted in the cavity and having an outer cylindrical wall in close proximity to and of sufficient length to bridge longitudinally across the poles of the magnetic field member, said outer rotor being formed with a ring of high magnetic reluctance situated between the poles, an inner rotor of magnetizable material mounted coaxially with the outer rotor comprising a cylindrical element within the outer rotor and in close proximity to the inner surface thereof to form a magnetic flux path around the ring of high magnetic reluctance, a fluid suspension of magnetizable particles disposed in the gap between the inner and outer rotors, a cooling lubricant disposed in the gap between the outer rotor and the housing, means for circulating the lubricant including a passageway communicating with opposite ends of the cavity of the housing, and means for restraining the entrance of magnetizable particles in the lubricant between the outer rotor and the housing including a magnetic trap in said passageway.

References Cited in the file of this patent

UNITED STATES PATENTS

| | | |
|---|---|---|
| 1,281,842 | Rosnick | Oct. 15, 1918 |
| 1,364,325 | Sitney | Jan. 4, 1921 |
| 1,515,869 | Mayer | Nov. 18, 1924 |
| 1,722,302 | Lamb | July 30, 1929 |
| 1,928,301 | Pierson | Sept. 26, 1933 |
| 1,970,236 | Kluge | Aug. 14, 1934 |
| 2,373,663 | Drake | Apr. 17, 1945 |
| 2,519,449 | Findley | Aug. 22, 1950 |
| 2,525,571 | Winther | Oct. 10, 1950 |
| 2,543,394 | Winther | Feb. 27, 1951 |
| 2,575,360 | Rabinow | Nov. 20, 1951 |
| 2,590,029 | Minorsky | Mar. 18, 1952 |
| 2,605,876 | Becker | Aug. 5, 1952 |
| 2,620,900 | Du Rostu | Dec. 9, 1952 |
| 2,663,809 | Winslow | Dec. 22, 1953 |
| 2,712,371 | Duncan | July 5, 1955 |
| 2,743,800 | Levinson | May 1, 1956 |

FOREIGN PATENTS

| | | |
|---|---|---|
| 973,367 | France | Sept. 13, 1950 |
| 976,917 | France | Nov. 1, 1950 |

OTHER REFERENCES

Vickers Bulletin No. 6000.
A. I. E. E., Technical Paper 50–24, December 1949.
National Bureau of Standards, Technical Report 1213.